Figure 1:
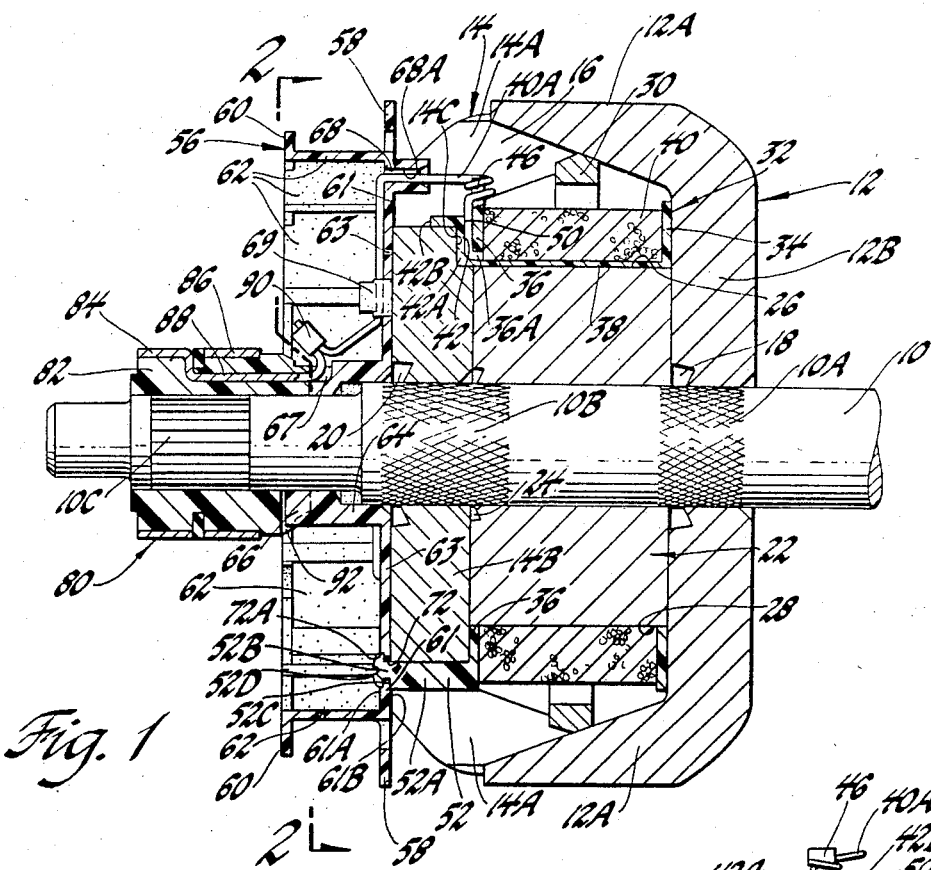

United States Patent [19]

Gold

[11] Patent Number: 4,588,911
[45] Date of Patent: May 13, 1986

[54] ALTERNATING CURRENT GENERATOR ROTOR AND FAN

[75] Inventor: Lowell C. Gold, Anderson, Ind.

[73] Assignee: General Motors Corporation, Detroit, Mich.

[21] Appl. No.: 681,638

[22] Filed: Dec. 14, 1984

[51] Int. Cl.$^4$ .................................................. H02K 9/00
[52] U.S. Cl. ........................................ 310/62; 310/43; 310/71; 310/194; 310/232; 310/263
[58] Field of Search ............... 310/263, 209, 261, 62, 310/194, 63, 43, 45, 216, 156, 71, 42, 91, 58, 59, 232, 68 D

[56] References Cited

U.S. PATENT DOCUMENTS

| | | | |
|---|---|---|---|
| 2,997,776 | 8/1961 | Matter | 336/97 |
| 3,076,110 | 1/1963 | Larson | 310/194 |
| 3,184,625 | 5/1965 | Farison | 310/59 |
| 3,198,972 | 8/1965 | Larson | 310/68 D UX |
| 3,271,604 | 9/1966 | Priddy | 310/71 |
| 3,422,339 | 1/1969 | Baker | 310/68 D UX |
| 3,538,361 | 11/1970 | Hilterbrick | 310/68 D UX |
| 3,538,362 | 11/1970 | Cheetham | 310/71 |
| 3,603,825 | 9/1971 | Sheridan | 310/194 |
| 4,162,419 | 7/1979 | De Angelis | 310/62 |
| 4,399,379 | 8/1983 | Marks | 310/62 |
| 4,418,295 | 11/1983 | Shiga | 310/59 |
| 4,419,597 | 12/1983 | Shiga | 310/68 D |
| 4,488,070 | 12/1984 | Iwaki | 310/63 |

FOREIGN PATENT DOCUMENTS 1113428 5/1968 United Kingdom .................. 310/62

*Primary Examiner*—R. Skudy
*Attorney, Agent, or Firm*—C. R. Meland

[57] ABSTRACT

A rotor for an alternating current generator in which the rotor shaft carries a pair of pole members and a core member. A spool that is formed of electrical insulating material is carried by the core member and has ribs that fit within slots formed in the core member. The spool supports a field coil, the inner turns of which engage the ribs and portions of the core disposed between the ribs. The rotor shaft supports a cooling fan that is formed of electrical insulating material. The fan is connected to a plurality of posts that extend axially from the spool. The fan supports a pair of lead wires that connect the field coil to the slip rings of a slip ring assembly.

5 Claims, 3 Drawing Figures

ALTERNATING CURRENT GENERATOR ROTOR AND FAN

This invention relates to a combined rotor and cooling fan for an alternating current generator.

Alternating current generators that have a combined rotor and cooling fan are well known in the prior art, examples being the combined rotors and fans disclosed in British Pat. No. 1113248 and in the U.S. Pat. Nos. to Larson 3,198,972, to Baker 3,422,339 and Hilterbrick et al. 3,538,361. In British Pat. No. 1113248, one of the two fans (internal fan) and a support for the slip rings is comprised of a one-piece synthetic resin molding. The other fan is located externally of the alternator. In the Larson patent, a pair of fans are provided which are respectively connected to the rotor pole members. In the Baker patent, one fan is located adjacent a rotor pole member and another fan is located externally of the alternator. In Hilterbrick et al., a bidirectional cooling fan is press-fitted to a serrated portion of the rotor shaft.

One of the objects of this invention is to provide an improved rotor and fan for an alternating current generator wherein the fan is a one-piece plastic molding that is carried by the rotor shaft. The fan engages one of the segments or pole members of the rotor and the fan is connected to a plurality of posts that extend axially from a spool formed of insulating material that carries the field coil of the rotor.

Another object of this invention is to provide a combined rotor and fan for an alternating current generator wherein the fan is formed of plastic insulating material and wherein the fan supports the end lead wires of the rotor field coil that are electrically connected to the rotor slip rings and further wherein the slip rings, fan and insulating spool for the field coil are all interconnected in such a manner as to provide proper relative rotary orientation between these parts.

IN THE DRAWINGS

Figure 2:
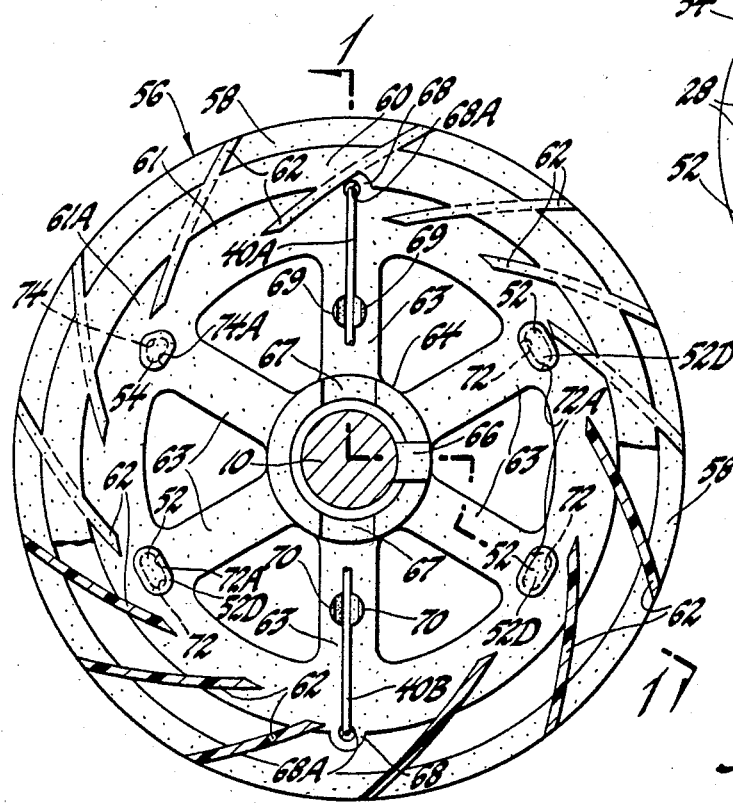
Figure 3:
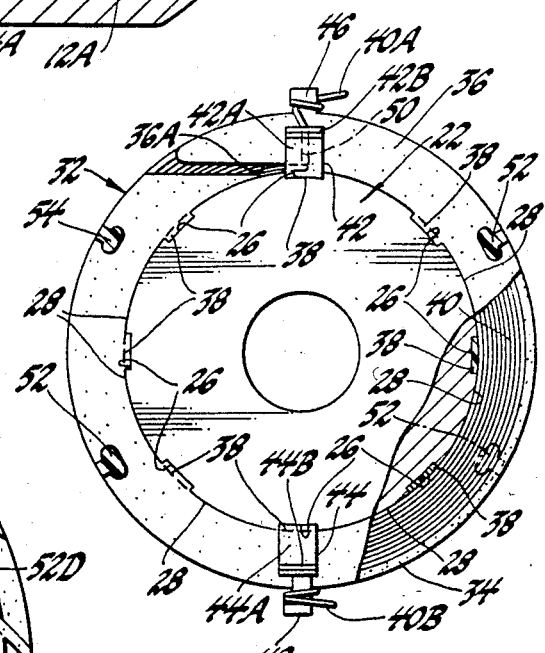

FIG. 1 is a sectional view of a rotor made in accordance with this invention taken along line 1—1 of FIG. 2;

FIG. 2 is an end view partly in section of the rotor illustrated in FIG. 1 looking in the direction of arrows 2—2; and FIG. 3 is an end view of the rotor core and coil assembly of the rotor of this invention illustrating how the ribs of the spool fit into the grooves of the rotor core and illustrating how the inner turns of the field coil are wound over the spool ribs and into engagement with portions of the outer periphery of the rotor core located between the ribs.

The rotor of this invention forms the rotor of an alternating current generator and in use the rotor rotates within the stator core of the generator that carries a three phase stator winding. This type of generator is well known to those skilled in the art, one example being the generator disclosed in the U.S. Pat. No. to Cheetham et al. 3,538,362.

Referring now to the drawings and more particularly to FIG. 1, the rotor of this invention comprises a steel shaft designated by reference numeral 10 which has two helix-diamond knurled portions 10A and 10B and a straight-knurled portion 10C. The rotor has a pair of poles or segments designated respectively by reference numerals 12 and 14. The segments are formed of a magnetic material such as steel and each segment has a plurality of circumferentially spaced pole teeth (for example six pole teeth) which are designated respectively by reference numerals 12A and 14A. The pole teeth 12A extend from an annular portion 12B which has a central opening that receives shaft 10. The pole teeth 14A extend from an annular portion 14B which also has a central opening that receives shaft 10. The pole teeth of each segment are separated by gaps, one of which is designated by reference numeral 16. The pole teeth of the two segments are interleaved, that is the pole teeth of a segment are located in the gaps between the pole teeth of the other segment. The configuration of the pole teeth and how they are interleaved is well known to those skilled in the art and is disclosed in the U.S. Pat. No. 3,271,604 to Priddy. The segments 12 and 14 are secured to the shaft 10 by circular staking portions of the segments into engagement with the knurled portions 10A and 10B of the shaft 10. These staked portions have been designated by reference numerals 18 and 20.

The rotor has a cylindrical core member designated by reference numeral 22 which is formed of a magnetic material, such as steel. The end faces of core 22 engage inner annular faces of portions 12B and 14B of the segments 12 and 14. The core member 22 has a central opening that receives shaft 10 and is secured to the shaft 10 by circular staking a portion thereof into engagement with a portion of the knurled portion 10B of the shaft 10. The staked portion of core 22 is designated by reference numeral 24.

The steel core member 22 has eight longitudinally extending grooves or slots, each designated by reference numeral 26, which are located at the outer periphery of core 22 and which extend for the entire length of the core member 22. Located between the slots 26 are outer arcuately extending surfaces 28 of the outer periphery of the core member 22. The entire outer periphery or surface of the core member 22, including the slot surfaces but excluding the end faces, has a thin paint coating of electrical insulating material which has not been illustrated. One type of insulating paint that may be used to coat the rotor core is a two-part epoxy wet paint that can be sprayed on the core. The paint or coating may be prepared by mixing an epoxy resin and a hardener. By way of example, the resin may be a type 109-C-38 resin and the hardener a type 109-L-60 blue hardener, both of which are designations of and supplied by Lilly Industrial Coatings Inc., Indianapolis, Ind. After being applied to core 22 the paint or coating is cured or sets-up to provide a thin solid coat of insulation over the outer periphery of the rotor core. The paint or insulating coating preferably has a thickness of about 0.04 to 0.07 mm.

The rotor has an annular ring 30 formed of a nonmagnetic material, such as aluminum, which tightly engages inner surfaces of the pole teeth 12A and 14A.

The rotor of this invention has a field coil supporting spool that is formed of a molded electrical insulating material (fiber filled nylon) which is generally designated by reference numeral 32. The spool 32 has annular end flanges 34 and 36 and has eight axially extending ribs or struts, each designated by reference numeral 38 which connect or join the flanges 34 and 36. The ribs 38 are located within the slots 26 formed in the rotor core 22 as is illustrated in FIG. 3.

The spool 32 carries a field coil designated by reference numeral 40 which is comprised of a number of turns of insulated copper wire. The inner turns of the copper wire of the field coil 40, are wound directly against the outer surfaces of ribs 38 and against the outer arcuate surfaces 28 of core 22. It is seen, from FIG. 3, that the flange 36 has a slot 36A. The flange 36 also carries a pair of L-shaped lugs 42 and 44 and has a pair of radially extending posts 46 and 48. The L-shaped lugs 42 and 44 are comprised respectively of portions 42A and 42B and 44A and 44B. When the field coil 40 is wound on the spool 32 and core 22 the spool is first fitted to the core 22 by sliding the ribs 38 into the slots 26 of the core 22. In order to start the winding of the field coil, a conductor end 40A is wound around the post 46 and then passed through a slot 50, located behind the lug 42, and then through slot 36A into the area between flanges 34 and 36 whereby the wire is in position to form the first inner turn of the field coil. The field coil is then wound in the space between the flanges 34 and 36 with the inner turns of the field coil directly engaging the outer surfaces of ribs 38 and outer arcuate surfaces 28 of the core 22. The finish lead of the field coil is designated by reference numeral 40B and it is wrapped around the post 48. The end portions of field coil 40 engage inner surfaces of the spool flanges 34 and 36 and these flanges retain the field coil 40 in the winding space between the flanges.

The spool 32 has four axially extending posts, three of which are designated by reference numeral 52 and one of which is designated by reference numeral 54. These posts are integral parts of the spool 32 and extend axially from the flange 36 of the spool 32. The posts 52 are of identical size and shape whereas the post 54 has a slightly different size and shape. These posts extend axially through the gaps 16 between the pole teeth 14A of the segment 14 and are ultrasonically welded to a generator cooling fan which is generally designated by reference numeral 56.

The fan 56 is a one-piece, plastic molded part which may be formed, for example from a nylon molding material. The fan 56 has a pair of axially spaced annular portions 58 and 60 and an annular portion 61 all of which are joined or connected by fan blades 62. The fan 56 has a hub portion 64 which is connected to annular portion 61 by radially extending spokes 63. The hub portion 64 is press-fitted to shaft 10 and has an axially extending lug 66 and a pair of diametrically opposed slots 67. The fan 56 has a pair of cylindrical portions 68 each of which has a hole or opening 68A which respectively receive the ends 40A and 40B of the field coil 40. The fan 56 further has pairs of integral conductor retaining ears 69 and 70 which receive the lead ends of the field coil 40. These ears are slightly resilient so that the conductor can be pressed into the gap between the ears. The diameter of the conductor is slightly larger than the gap between the ears so that when the conductor is pressed into the gap the ears spread apart slightly and the ears then tightly grip the conductor to hold it in place.

The fan 56 has three oblong shaped holes 72 which extend through annular portion 61 and which are each bounded by a recess 72A formed in surface 61A of fan portion 61. The holes 72 are adapted to respectively receive the ends of the axially extending posts 52 on the spool 32. The fan 56 has another hole 74 bounded by a recess 74A. The hole 74 and recess 74A are of a slightly different shape than the oblong holes 72. The hole 74 receives the end of the post 54.

When the fan 56 is assembled it is press-fitted to the shaft 10 and is moved toward the end of spool 32 such that the ends of posts 52 slide through the oblong holes 72 and the end of post 54 slides through the hole 74. Due to the fact that posts 52 have a different shape than post 54 the fan can only have one correct rotary orientation when it is assembled to the posts. The posts 52 each have a portion 52A which is of larger cross section than a portion 52B which slides through an oblong hole 72. The difference in the cross-sectional areas defines a ledge or face 52C which engages the surface 61B of the fan portion 61 when the portions 52B of the posts slide through the holes 72 in the fan. The end of post portion 52B is then hot upset by an ultrasonic welding operation so that the ends of post portions 52B are headed or swedged over and moved into engagement with fan surface 61A. This hot upset or headed over portion has been indicated by reference numeral 52D. When the end of a post portion 52B is hot upset the material of the post portion flows into recess 72A. In the final hot upset condition, portion 61 of fan 56 is clamped between headed over portion 52D and ledge or face 52C of post 52. Prior to the ultrasonic hot upset operation, the end of portion 52B of the post 52 extends slightly beyond the surface 61A of fan portion 61. The end of post 54 is secured to the portion 61 of fan 56 in the same manner as the hot upsetting of posts 52 to portion 61.

The rotor of this invention includes a slip ring assembly which is generally designated by reference numeral 80. The slip ring assembly 80 comprises a bored insulator designated by reference numeral 82 which is secured to the shaft by forcing the insulator over the straight knurled portion 10C of shaft 10. The straight knurls bite into the insulator 82 to thereby secure it to shaft 10. The insulator 82 carries a pair of annular copper slip rings 84 and 86, each of which has an integral axially extending conductor or connector, one of which is shown in FIG. 1 and designated by reference numeral 88. The connectors that are integral with the slip rings are flat, rectangular strips about 6 mm. wide and about 1 mm. thick. The slip rings and their integral conductors are molded to the insulator 82. The conductor 88 is connected to the end lead 40A of field coil 40 by fitting the end lead and the end of conductor 88 into a metallic clip 90 and then crimping and subsequently welding the clip to the conductors. The extreme end portion of end lead wire 40A is bared of insulation prior to being inserted into clip 90. The slip ring 86 is connected to the end lead 40B of the field coil 40 in the same manner. This connection is not illustrated in the drawings. The slots 67 receive portions of the slip ring connectors that extend beyond an end of insulator 82.

In assembling the rotor of this invention the segment 12 is fitted to the shaft 10 and is staked thereto over the area designated by reference numeral 18. A coil winding assembly, which is illustrated in FIG. 3 and which comprises core 22, spool 32 and field coil 40, is then assembled to shaft 10 such that one end of core 22 engages an inner annular surface of portion 12B of segment 12. In assembling the field coil assembly of FIG. 3 to the shaft 10 an axially extending lug, formed on the outer face of flange 34 (not illustrated), is positioned within a recess (not illustrated) formed on the inner annular surface of the portion 12B of segment 12. This provides proper rotary orientation for the core 22 and spool 32. The core member 22 is then staked as at 24 to secure the core member to the knurled portion 10B of the shaft. The segment 14 is now assembled to shaft 10 and is staked to the knurled portion 10B over the area designated by reference numeral 20. The segment 14 has a pair of diametrically opposed radially extending slots 14C which receive the portions 42A and 44A of the lugs 42 and 44 of the spool 32 when the pole member 14 is moved against core member 22. This provides proper rotary orientation for segment 14.

With the parts assembled, as has been described, the fan 56 is press-fitted to the shaft 10 and as the fan 56 is moved into engagement with segment 14 the posts 52 and 54 pass through the respective openings 72 and 74 formed in the fan and with the fan held against segment 14 the ends of the posts are not upset in a manner that has been described. When the fan 56 is assembled, as has been described, the conductor ends 40A and 40B of the field coil 40 are passed through the holes 68A of the fan. These conductor ends are then forced into the ears 69 and 70 so that they are in a position where the insulation bared ends of these conductor ends can be placed in the clips 90.

With the rotor assembled, as has been described, the slip ring assembly 80 is then slipped onto the shaft 10 and moved so that an end surface of the insulator portion 82 engages the end of hub portion 64 of the fan. The insulator portion 82, of the slip ring assembly, has a radially extending slot 92 which receives the axially extending lug 66 of the fan 56. This provides proper rotary orientation for slip ring assembly 80. In this regard, the rotary orientation is such that when the slip ring assembly is assembled to the shaft the slip ring connectors are respectively aligned with the lead retaining ears 69 and 70 and hence are aligned with field coil leads 40A and 40B. When the slip ring assembly has been assembled to the shaft, the end of conductor 88 and the end of field coil lead 40A are located in the clip 90 and it is crimped and subsequently welded to the conductor 88 and to the end of lead 40A. The connection between slip ring 86 and the end 40B of field coil 40 is made in the same manner.

After the rotor has been assembled, as has been described, it is dipped in varnish to impregnate the rotor in a manner that is well known to those skilled in the art. The varnish, due to wicking, flows to some extent into areas between inner surfaces of spokes 63 and an outer surface of portion 14B of segment 14 and between any inner surface portions of fan portion 61 that overlap the outer surface of segment portion 14B. When this varnish has dried, it bonds the fan 56 to segment 14.

The fan 56 is nonrotatably secured to shaft 10 by the varnish bonding of the fan to segment 14 by the lug 66 of the fan which fits into slot 92 of the slip ring assembly 80 by the press fit of the fan to shaft 10 and to some extent by posts 52 and 54 that connect the spool and the fan. The fan is restrained from axial movement by its connection to the ends of posts 52 and 54.

The thin insulating coating on the copper wire that is used to wind field coil 40 has sufficient break down voltage so that it could be wound directly on a rotor core that did not have a coating of insulating material without fear of an electrical break down between the copper wire and the core. However, during the winding or handling of the wire of the field coil it is possible for the insulation on the wire to be nicked or punctured and if this should happen the insulating paint coating on the core would prevent a short circuit between the wire of the field coil and the core. If it could be assured that the coating of the insulation on the wire of the field coil was always uniform and always remained intact, when being handled or when being wound on the core, the coating of insulating material on the core would not be required and in such a case the insulated wire could be wound directly on the bare metal of the core.

Since the fan 56 is formed of electrical insulating material it serves both as a fan and as an insulator for insulating the ends of field coil 40 that are connected to the slip rings from the segment 14.

When the field coil 40 is tightly wound against exposed outer surfaces 28 of core 22 and against the outer surfaces of ribs 38 of spool 32 the inner surfaces of the ribs are forced into tight engagement with inner surfaces of the core slots 26. The radial dimension of slots 26 and ribs 38 are such that the outer surfaces of ribs 38 are flush with or extend slightly beyond the surfaces 28 or core 22 after the coil has been wound. This reduces the possibility of fracturing or puncturing the insulation on the wire of the field coil when it is wound, as described. The frictional engagement between the inner surfaces of ribs 38 and inner surfaces of slots 26, and the fact that ribs 38 are located in slots 26, prevents any relative rotation between core 22 and spool 32.

The relative dimensions of the outer surfaces of ribs 38 and outer surfaces 28 of core 22 are such that about 75% of the outer surface area of core 22 is contacted by the inner turns of field coil 40. The surface area of core 22, that is contacted by the inner turns of field coil 40, is made as large as possible consistent with providing sufficient material for ribs 36 that connect the spool flanges 34 and 36. The ribs 36 must be of sufficient strength as to properly support the end flanges 34 and 36 and the field coil 40 wound thereon.

The coating of insulating material on the core 22 can take forms other than the two part epoxy paint that has been described. For example, a coating of insulating material could be applied to core 22 by a so-called fluidized bed method wherein a heated metallic core part is placed in a cloud of suspended coating particles. The particles melt when they contact the core to provide a coating of insulating material on the core. This method is described in the U.S. Pat. No. 2,997,776 to Matter et al. and in the U.S. Pat. No. 3,076,110 to Larson et al. In general, the insulating material that coats core 22 should be as thin as possible so as to provide a good heat transfer path to the core 22 and still be capable of providing sufficient electrical insulation between the inner turns of the field coil 40 and the core 22.

The following is a summary of some of the advantages of a generator rotor made in accordance with this invention.

(1) Since substantial portions of the inner turns of the field coil are in direct contact with the metallic rotor core there is improved heat transfer to the rotor core for heat generated in the field coil.

(2) The use of ribs on the field coil supporting spool, that fit into slots in the rotor core, allows portions of the inner turns of the field coil to directly contact the rotor core and these ribs also serve as a supporting means for the end flanges of the spool.

(3) As compared to a spool and core arrangement, wherein a tubular portion of the spool entirely surrounds the cylindrical core, the spool and core arrangement of this invention has a larger cross-sectional area of magnetic material for a given winding circumference for the inner turns of the field coil. This increase in area corresponds to the arcuately extending end faces of core 22 that are located between slots 26. Putting it another way, the space that would be normally occupied by the spool thickness of the portion of a conventional field coil spool that surrounds the core can provide additional space for extra field coil winding turns and/or more iron on the core diameter of the core, depending on which is more cost effective.

(4) The use of a plastic fan provides a natural method of insulating the field coil leads from the rotor iron when connecting the field coil to the slip rings.

(5) A plastic fan provides more design flexibility to optimize the fan cooling efficiency.

(6) The posts, that are integral with the field coil spool and which are connected to the plastic fan, provide axial restraint of the fan at the outer extremities of the fan and also provide proper rotary orientation between the spool and fan and subsequently between the fan and slip ring assembly. The posts also provide for some torsional driving strength at the outer extremities of the fan.

The embodiments of the invention in which an exclusive property or privilege is claimed are defined as follows:

1. A combined rotor and fan for an alternating current generator comprising, a shaft, a pair of pole segments carried by said shaft formed of magnetic material having a plurality of interleaved pole teeth, means defining a core member, a field coil supporting spool formed of electrical insulating material disposed about said core member and located between said pole segments, a field coil supported by said spool, a plurality of posts integral with said spool extending axially thereof and extending through spaces located between the pole teeth of one of said pole segments, and said fan secured to the ends of said posts.

2. A combined rotor and fan for an alternating current generator comprising, a shaft, a pair of pole segments carried by said shaft formed of magnetic material having a plurality of interleaved pole teeth, means defining a core member, a field coil supporting spool formed of electrical insulating material disposed about said core member and located between said pole segments, a field coil supported by said spool, a plurality of posts integral with said spool extending axially thereof and extending through spaces located between the pole teeth of one of said pole segments, and said fan formed of plastic material secured to the ends of said posts.

3. A combined rotor and fan for an alternating current generator comprising, a shaft, a pair of pole segments carried by said shaft formed of magnetic material having a plurality of interleaved pole teeth, means defining a core member, a field coil supporting spool formed of electrical insulating material disposed about said core member and located between said pole segments, a field coil supported by said spool, a plurality of posts integral with said spool extending axially thereof and extending through spaces located between the pole teeth of one of said pole segments, said fan formed of electrical insulating material carried by said shaft and secured to the ends of said posts, a slip ring assembly secured to said shaft comprising an insulator carrying a pair of metallic slip rings, and a pair of lead wires supported by said fan connecting said field coil to said slip rings.

4. A combined rotor and fan for an alternating current generator comprising, a shaft, a pair of pole segments carried by said shaft formed of magnetic material having a plurality of interleaved pole teeth, means defining a core member, a field coil supporting spool formed of electrical insulating material disposed about said core member and located between said pole segments, a field coil supported by said spool, a plurality of posts integral with said spool extending axially thereof and extending through spaces located between the pole teeth of one of said pole segments, and said fan carried by said shaft having a hub portion disposed about said shaft and having radially extending wall means engaging an outer surface of said one of said pole members, the end portions of said posts extending through openings formed in said fan and being headed over into engagement with said fan to thereby restrain said fan from axial movement.

5. A combined rotor and fan for an alternating current generator comprising, a shaft, a pair of pole segments carried by said shaft formed of magnetic material having a plurality of interleaved pole teeth, means defining a core member, a field coil supporting spool formed of electrical insulating material disposed about said core member and located between said pole segments, a field coil supported by said spool, a plurality of posts integral with said spool extending axially thereof and extending through spaces located between the pole teeth of one of said pole segments, said fan formed of electrical insulating material secured to the ends of said posts, a slip ring assembly carried by said shaft comprising an insulator carrying a pair of metallic slip rings, each having an integral slip ring connector, a pair of lead wires carried by said fan connecting said slip ring connectors to said field coil and a lug formed in one of said slip ring insulator and said fan located in a slot formed in one of said slip ring insulator and said fan for properly rotatably orienting said slip ring connectors relative to said lead wires.

* * * * *